United States Patent [19]

Farwaha et al.

[11] Patent Number: 5,610,225
[45] Date of Patent: Mar. 11, 1997

[54] LATEX PAINTS WHICH ARE FREE OF VOLATILE COALESCENTS AND FREEZE-THAW ADDITIVES

[75] Inventors: Rajeev Farwaha, Brampton; Lien Phan, Mississauga; William Currie, Elmira, all of Canada

[73] Assignee: National Starch and Chemical Investment Holding Corporation, Wilmington, Del.

[21] Appl. No.: 434,098

[22] Filed: May 3, 1995

[51] Int. Cl.$^6$ ............................ C08L 33/14; C08F 220/28
[52] U.S. Cl. .............................. 524/558; 526/320
[58] Field of Search .............................. 524/558; 526/320

[56] References Cited

U.S. PATENT DOCUMENTS

| | | | |
|---|---|---|---|
| 3,896,161 | 7/1975 | Borden et al. | 560/224 |
| 4,075,411 | 2/1978 | Dickstein | 560/224 |
| 4,077,926 | 3/1978 | Sanderson et al. | 524/588 |
| 4,268,641 | 5/1981 | Koenig et al. | 524/588 |
| 4,322,328 | 3/1982 | Graetz et al. | 524/458 |
| 4,668,730 | 5/1987 | Iovine et al. | 524/460 |
| 5,124,393 | 6/1992 | Ingle et al. | 524/558 |
| 5,134,186 | 7/1992 | Ingle et al. | 524/558 |
| 5,157,071 | 10/1992 | Ingle | 524/558 |
| 5,206,286 | 4/1993 | Swarup et al. | 524/761 |
| 5,208,285 | 5/1993 | Boyce et al. | 524/516 |
| 5,212,225 | 5/1993 | Ingle | 524/558 |
| 5,219,917 | 6/1993 | Ingle et al. | 524/558 |
| 5,227,423 | 7/1993 | Ingle | 524/558 |

FOREIGN PATENT DOCUMENTS 0107300  1/1983  European Pat. Off. .

*Primary Examiner*—Peter A. Szekely
*Attorney, Agent, or Firm*—William K. Wissing

[57] ABSTRACT

Freeze-thaw stable latex binders and latex paint compositions are prepared without the use of volatile freeze-thaw additives. The latex binder contains a polymer which is the emulsion polymerization product of a polymerizable polyethylene glycol (PPEG) monomer, wherein the molecular weight of the ethylene oxide moiety in the PPEG monomer is from about 175 to 1,100, at least one acrylic monomer and, optionally, one or more styrenic, ionic or wet adhesion monomers. Methods for preparing the freeze-thaw stable latex compositions are also disclosed.

10 Claims, No Drawings

LATEX PAINTS WHICH ARE FREE OF VOLATILE COALESCENTS AND FREEZE-THAW ADDITIVES

FIELD OF THE INVENTION

The present invention relates to latex binders for use in latex paints, to latex paint compositions which are free of volatile coalescents and volatile freeze-thaw additives and to methods of preparing such latex compositions.

BACKGROUND OF THE INVENTION

The properties that are desirable in aqueous latex paints, namely the ability to be used at a temperature low enough for application over a long seasonal range, to withstand repeated cycles of freezing and thawing, and to form a film hard enough to avoid tackiness or blocking and dirt pickup in the intended application, are enhanced in latex-based paint formulations by the addition of volatile coalescing solvents and freeze-thaw additives. These coalescing solvents, for example, butyl carbitol acetate and 3-hydroxy-2, 2,4-trimethylpentyl isobutyrate, and freeze-thaw additives, for example, propylene glycol and ethylene glycol, are volatile organic compounds (VOC) that are present in amounts up to 360 g per liter of paint (3 lbs. per gallon), not including water. With the universal recognition that VOCs are detrimental to the environment, there is a need for latex-based paints that contain no volatile coalescing solvents or freeze-thaw additives.

Latex paints employ latex binders as film formers and binders for pigments, fillers and the like, which are used in latex paints. The latex binders typically comprise emulsion polymers. Coalescing solvents normally are required because the latex binders used in latex paints must have the lowest possible film forming temperature (MFFT) and the highest possible glass transition temperature (Tg). The MFFT is the lowest temperature at which the polymer particles of the latex binder will mutually coalesce and form a continuous film when the water, which is the solvent base, evaporates. Polymers that have low MFFT extend the temperature conditions under which the paint can be applied. The Tg is the temperature at which a polymer changes from an amorphous, soft and tacky state to a glassy, hard, and rigid state. Polymers with high Tg values will result in a paint coating that will be hard, resistant to abrasion and resistant to blocking. Volatile coalescing solvents effectively lower the Tg of the polymer to meet the desired low MFFT on application, and then eventually diffuse out of the paint and evaporate under normal ambient conditions of temperature, humidity and atmospheric pressure, leaving a high Tg film. Freeze-thaw additives are added to paint formulations simply to impart freeze-thaw stability during transportation and storage.

The pigments or fillers present in the paint formulation result in anti-blocking characteristics in the paint film. The relationship between hardness of the coating and the amount of pigment is represented by pigment volume concentration (PVC), which is the fractional volume of pigment in a unit volume of resin. Thus, low PVC coatings, such as semi-gloss paints, contain relatively low levels of pigment, and high PVC coating compositions, such as satin to flat paints, contain high levels of pigments. Polymers with low Tg and MFFT in low PVC paint formula will exhibit blocking tendencies. On the other hand, the soft latices will show anti-blocking characteristics in high PVC paint formulas. In low PVC paint formulas, glass transition of the polymer (Tg) determines the hardness of the coating. In high PVC paint formulas, pigments determine the hardness of the coating. The Tg of the polymer can be calculated using the Fox equation, $1/Tg \text{(polymer)} = W_{(a)}/Tg_{(a)} + W_{(b)}/Tg_{(b)} + \ldots$ where $W_{(a)}$ and $W_{(b)}$ are the weight fractions of comonomers (a) and (b) and $Tg_{(a)}$ and $Tg_{(b)}$ are the glass transition temperatures for homopolymers (a) and (b), respectively. Glass transition temperatures for various homopolymers are available in many literature sources, including J. Brandup and E. H. Immergut, *Polymer Handbook*, 2nd ed., John Wiley & Sons, New York, pp. 139–192 (1975).

In organic-solvented paint systems, researchers have been combating the freeze-thaw issue by using blends of surfactants in place of traditionally employed anionic surfactants. For example, methods for making a viscosity stable latex by blending a cationic surfactant, an amphoteric surfactant, and a non-ionic surfactant in a prescribed ratio are known. However, the blended system is not satisfactory in many other aspects. The preparation of sterically stabilized latex particles by copolymerizing non-ionic surfactants are known. The synthesis of copolymerizable esters of alkyloxy glycols, wherein the alkyl group contains from 8 to 24 carbon atoms, and their use as emulsifiers and stabilizers in emulsion polymerization have been reported.

There is a growing concern about the potentially adverse environmental and health effects of many of the volatile coalescing solvents and freeze-thaw additives. There is a growing need for polymers, for use in latex binders in latex paints, which will provide desired hardness properties, adequate film formation at low temperature, and flexibility. In addition, it is also desirable to eliminate volatile coalescents and freeze-thaw additives from trade sale paints without compromising physical properties such as coating hardness, low MFFT and freeze-thaw stability. Accordingly, it would be desirable to develop polymeric latex binders, particularly acrylic or styrene/acrylic polymer latex binders, which have the MFFT and Tg required for use in latex paint compositions, which are free of volatile coalescing solvents or freeze-thaw additives and which maintain adequate freeze-thaw stability, abrasion resistance and anti-blocking properties.

SUMMARY OF THE INVENTION

The present invention is directed to latex paint compositions which are free of volatile coalescing solvents and freeze-thaw additives and which comprise a latex binder which contains a polymer which is the emulsion polymerization product of a polymerizable polyethylene glycol (PPEG) monomer, at least one acrylic monomer and, optionally, one or more monomers selected from the group consisting of styrenic monomers, ionic monomers and wet adhesion monomers. The invention is also directed to methods of preparing freeze-thaw stable latex paint compositions without the use of volatile freeze-thaw additives and to the freeze-thaw stable latex binders.

DETAILED DESCRIPTION OF THE INVENTION

The latex binders according to the present invention must have a MFFT of less than 5° C., yet provide sufficient abrasion resistance in order to function as a binder in the latex paint composition according to the present invention. Generally, the level of abrasion resistance required of a latex paint will depend upon the anticipated end-use of the paint. More abrasion resistance is required where the conditions under which the paint must endure are more severe. Additionally, the latex binders and the paint compositions must be freeze-thaw stable, meaning that they survive five freeze-thaw cycles. Finally, the paint compositions must be resistant to blocking.

According to the present invention, it has been discovered that freeze-thaw stable, polymeric latex binders which have a MFFT of less than 5° C. and which provide sufficient abrasion and blocking resistance required for use as a latex binder in latex paint compositions according to the present invention may be prepared without the use of volatile coalescents or freeze-thaw additives. "Volatile coalescent" and "volatile freeze-thaw additive", as used herein, refer to those coalescents and freeze-thaw additives which diffuse out from the applied film of the latex paint and evaporate under typical ambient conditions. By typical ambient conditions, it is meant those conditions of temperature, humidity and barometric pressure under which latex paints are typically applied and cured.

The term "latex" is used herein in its conventional meaning, i.e. a dispersion of particulate matter in an aqueous phase which contains an emulsifier or surfactant suitable for preparing the latex. Latex binders, as used herein, comprise a polymer dispersed in an aqueous phase with an appropriate emulsifier or surfactant.

According to one embodiment of this invention, there are provided polymeric latex binders which comprise acrylic or styrene/acrylic polymers which are the polymerization products of a polymerizable polyethylene glycol (PPEG) monomer of structure I

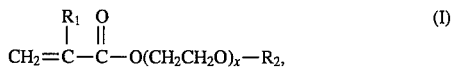

wherein $R_1$ and $R_2$ are independently H or $CH_3$ and x is from about 4 to 25, and at least one acrylic monomer. The polymers may further comprise 0 to 40 pphm of the polymerized residue of optional styrenic monomers, such as styrene, halogenated styrene and alkyl-substituted styrene. Other optional monomers include ionic monomers to impart mechanical stability and monomers to enhance wet adhesion. In a second embodiment of the invention, latex paint compositions utilize the latex binders of the present invention in amounts effective to provide a latex paint which is freeze-thaw stable, which has a MFFT of less than 5° C. and which has sufficient abrasion and blocking resistance for its intended use.

The latex binders of this invention are particularly advantageous for use in aqueous coating compositions. The first advantage of these binders is that they permit the formulation of aqueous coatings having adequate film formation and a desirable balance of hardness. The second advantage is that they can be used to formulate latex paints which require no freeze-thaw additive, such as ethylene glycol or propylene glycol, yet which exhibit excellent freeze-thaw stability. It is preferred that the latex binders and the latex paints of the present invention be substantially free of any volatile coalescing solvent or volatile freeze-thaw additive. More preferably, the binders and paints will be free of any volatile coalescing solvent or volatile freeze-thaw additive. One will recognize that small amounts of either volatile coalescing solvents or freeze-thaw additives may be added if desired, although they should not be present in any appreciable amounts and are not required in the present invention.

The molecular weight of the ethylene oxide (EO) moiety contained in the PPEG monomer is from about 175 to about 1,100, preferably from about 200 to about 1,000. More preferably the EO molecular weight is less than about 900 and most preferably from about 200 to 880. As the molecular weight of the EO is increased to greater than about 1,100, poor block resistance is exhibited in the latex paint composition. The PPEG monomer is used in amounts effective to impart freeze-thaw stability to the latex binder without the use of a volatile freeze-thaw additive. The amount of PPEG monomer required depends on factors such as pigment/volume concentration, relative hydrophilicity of the polymer, surfactant systems and the like. One skilled in the art, once armed with the present specification, would be able to determine how much PPEG should be used to prepare a particular latex binder to be used in a particular latex paint. Preferably, the polymer will comprise the polymerized residue of from about 1 to 2.5 parts by weight of the PPEG monomer per 100 parts by weight of total monomer(s) used to prepare the polymer (pphm).

The polymer also comprises the polymerized residue of at least one acrylic monomer which is copolymerizable with the PPEG monomer. The acrylic monomer is selected from the group consisting of $C_1$-$C_{10}$ alkyl esters of α,β-ethylenically unsaturated $C_2$-$C_6$ monocarboxylic acids; hydroxy $C_1$-$C_4$ alkyl esters of α, β-ethylenically unsaturated $C_2$-$C_6$ monocarboxylic acids; and $C_4$-$C_8$ alkyl di-esters of α,β-ethylenically unsaturated $C_4$-$C_8$ dicarboxylic acids. Preferably, the acrylic monomer is selected from the group consisting of $C_1$-$C_{10}$ alkyl esters of acrylic and methacrylic acid and $C_4$-$C_8$ alkyl di-esters of maleic, itaconic and fumaric acids. Preferably, at least one $C_1$-$C_8$ alkyl ester of acrylic acid is utilized. Particularly preferred acrylic monomers include methyl acrylate, ethyl acrylate, butyl acrylate, 2-ethyl hexyl acrylate, decyl acrylate, methyl methacrylate, butyl methacrylate, i-butyl methacrylate, i-bornyl methacrylate, hydroxy ethyl acrylate, hydroxy ethyl methacrylate.

The polymer may also comprise 0 to 2 pphm of the polymerized residue of an ionic monomer. In preferred embodiments, not more than about 1 pphm of the ionic monomer is used. The ionic monomers are utilized to impart mechanical stability to the latex binder and the latex paints, i.e., they are stable upon application of shear to the latex binders or paints, such as during pumping of the latex binder and/or the paint compositions during processing and during addition of the latex binder to the "grind" portion of the paint formulation during the preparation thereof. The "grind" is that portion of the paint formulation which includes the pigments, fillers and the like. The pigments and fillers are "ground" using conventional mixing techniques, to a particular Hegman dispersion value. The grind is then "let down", that is, the balance of the paint composition, including the latex binder and any balance of water, are added to the grind and mixed. Typical classes of ionic monomers include, but are not limited to, α,β-ethylenically unsaturated $C_3$-$C_8$ monocarboxylic and $C_4$-$C_8$ dicarboxylic acids, including the anhydrides thereof, and the $C_4$-$C_8$ alkyl half-esters of the α,β-ethylenically unsaturated $C_4$-$C_8$ dicarboxylic acids. Exemplary ionic monomers include acrylamido methyl propane, sulfonic acid, styrene sulfonate, sodium vinyl sulfonate, acrylic acid and methacrylic acid, and the $C_4$-$C_8$ alkyl half esters of maleic acid, maleic anhydride, fumaric acid, and itaconic acid. Particularly preferred ionic monomers include acrylic acid and methacrylic acid.

In order to optimize the wet adhesion of the latex paint formulation, the polymer may comprise 0 to 2 pphm of the polymerized residue of a wet adhesion monomer, or a combination of wet adhesion monomers. These monomers are well known in the art and include aminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N(3-dimethylamino-2, 2-dimethylpropyl)acrylamide and methacrylamide, N-dimethylaminomethy) acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacryloyloxyethyl) ethylene urea, N-(2-methacryloxyacetamidoethyl)-N, N'-ethyleneurea, allylalkyl ethylene urea, N-methacrylamidomethyl urea, N-methacryoyl urea, N-[3-(1,3-diazacryclohexan)-2-on-propy]methyacrylamide, 2-(1-imidazolyl)ethyl methacrylate, 2-(1-imidazolidin-2-on-)ethylmethacrylate, N-(methacrylamido)ethyl urea (DV2422, Rhone-Poulenc) and allyl ureido wet adhesion monomer (Sipomer WAM®, Rhone Poulenc). When used, the wet adhesion monomer will be present in an amount from 0.2% to 2.0% pphm.

The emulsion polymerization of the polymer can be accomplished by known procedures for polymerization in aqueous emulsion. Optionally, conventional seeding procedures can be employed to aid in controlling polymerization to achieve the desired average particle size and particle size distribution. If seeding is employed, the polymer seed will be present in amounts that correspond to about 0.1% to 8% by weight of the total polymer, and will range in size from about 20% to 60% of the diameter of the polymer particles to be formed.

The seed latex can constitute a previously prepared latex or polymer powder, or it can be prepared in situ. The monomeric composition of the seed latex can vary; however, it is preferable that it be substantially the same as that of the polymer.

The monomer or comonomers and, optionally, the seed to be employed in the preparation of the polymer, are dispersed into water with agitation sufficient to emulsify the mixture. The aqueous medium may also contain a free radical polymerization catalyst, an emulsifying agent (i.e., surfactant), or other ingredients that are known and conventionally employed in the art as emulsion polymerization aids.

Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those catalysts that are activated in the water phase by a water-soluble reducing agent. Such catalysts are employed in a catalytic amount sufficient to cause polymerization. As a general rule, a catalytic amount ranges from about 0.1 to 5 pphm. As alternatives to heat or catalytic compounds to activate the polymerization, other free radical producing means, such as exposure to activating radiation, can be employed.

Suitable emulsifying agents include anionic, cationic, and nonionic emulsifiers customarily used in emulsion polymerization. Usually, at least one anionic emulsifier is utilized and one or more nonionic emulsifiers may also be utilized. Representative anionic emulsifiers are the alkyl aryl sulfonates, alkali metal alkyl sulfates, the sulfonated alkyl esters, and fatty acid soaps. Specific examples include sodium dodecylbenzene sulfonate RHODACAL②DS-4, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts to achieve adequate emulsification and to provide desired particle size and particle size distribution.

Other ingredients known in the art to be useful for various specific purposes in emulsion polymerization, such as, acids, salts, chain transfer agents, and chelating agents, can also be employed in the preparation of the polymer. For example, if the polymerizable constituents include a monoethylenically unsaturated carboxylic acid monomer, polymerization under acidic conditions (pH 2 to 7, preferably 2 to 5) is preferred. In such instances, the aqueous medium can include those known weak acids and their salts that are commonly used to provide a buffered system at the desired pH range.

The manner of combining the polymerization ingredients can be by various known monomer feed methods, such as, continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Polymerization is initiated by heating the emulsified mixture with continued agitation to a temperature usually between about 50° to 100°, preferably between 60° to 100° C. Polymerization is continued by maintaining the emulsified mixture at the selected temperature until conversion of the monomer or monomers to polymer has been reached.

Following polymerization, the solids content of the resulting aqueous heterogeneous polymer latex can be adjusted to the level desired by the addition of water or by the removal of water by distillation. Generally, the desired level of polymeric solids content is from about 20 to 60% by weight on a total weight basis.

The size of the polymer particles can vary; however, for optimum water resistant, it is preferable that the particles have an average diameter of less than 500 nanometers. In general, for the polymer of this invention, the smaller the average particle size, the more water resistant the polymer. Suitable particle sizes generally can be achieved directly from the polymerization. However, screening of the resulting latex to remove particles outside the desired size range, and thus narrowing the particle size distribution, may be employed.

For various applications, it is sometimes desirable to have small amounts of additives, such as, surfactants, bactericides, pH modifiers, and antifoamers, incorporated in the latex. This may be done in a conventional manner and at any convenient point in the preparation of the latexes.

The paints are formulated using techniques known to those skilled in the art of manufacturing paint. Generally, water, defoamer, stabilizer, pigment, filler and surfactant are combined to form the grind, where the pigments and fillers are ground to a desired particle size as indicated by a Hegman reading of 2 to 3. Additional water, latex binder, rheology modifiers, biocides and the like are added to the grind and the entire batch is blended and adjusted to desired Hegman readings and viscosity.

The following test procedures and organic-solvent-free, semi-gloss latex paint formulation were used to evaluate the latex binders and latex paints of the present invention.

Test Procedures

Blocking Resistance

Six mil films (1 mil=25 microns) were cast over leneta 3-B Opacity charts and allowed to dry at constant temperature and humidity (22° C. and 40 to 60% relative humidity) for 7 days. At the end of the first, second and seventh days, two portions of the coated charts were placed face-to-face and subjected to 0.070 kg/cm² (1 psi) pressure for 1 day at a constant temperature of 22° C. and 40 to 60% relative humidity. At the end of the seventh day, an additional two pieces of the chart were subjected to 0.070 kg/cm² (1 psi) in a 35° C. oven for 30 minutes. Blocking resistance was determined visually when the panels were pulled apart with manual force and rated as follows:

| Blocking Resistance | |
|---|---|
| Numerical Rating | Type of Separation |
| 10 | no tack |
| 9 | trace tack |
| 8 | very slight tack |
| 7 | very slight to slight tack |
| 6 | slight tack |
| 5 | moderate tack |
| 4 | very tacky |
| 3 | film ruptures 5 to 25% when pulled apart |
| 2 | film ruptures 25 to 50% when pulled apart |
| 1 | film ruptures 50 to 75% when pulled apart |
| 0 | film ruptures 75 to 100% when pulled apart |

Low Temperature Film Formation

The paint composition was conditioned in a 2° to 5° C. refrigerator for 1 hour, and a 3 mil film of the paint then applied over a 19 BR leneta chart. The film was allowed to dry overnight at 2° to 5° C. and visually examined for signs of cracking. A paint was deemed to form acceptable films when no difference could be seen between the film applied at 5° C. and a film applied at room temperature (22° C.).

Abrasion Resistance (Scrubability) ASTM 24860

A test scrub panel was prepared by drawing a 7.0 mil film of paint on a leneta chart and allowing the paint to dry for 7 days in an open room kept at 23°±2° C. and 50±5% relative humidity. The dried chart was affixed to a glass panel and put into a scrub machine equipped with a scrub brush and a basin for holding the test panel. The brush was prepared by immersing it overnight in 2% solution of Triton®X-100 surfactant. The brush was placed in the machine holder and the test scrub panel was put under the brush. The brush bristles were spread evenly with 10 grams of a standardized scrub medium (available from Leneta Co.). The panel was then wet with 5 ml of reagent water in the path of the brush. The scrub machine was started. After every 800 strokes before failure, 10 grams of scrub medium and 5 ml of reagent water were added to the brush bristles. The number of strokes to the paint at which 0.5 inch of black chart shows through the test panel was recorded.

Freeze-Thaw Stability Test

The paint sample was transferred into a 250 ml stainless steel can and was kept in the freezer for 18 hours at −18° C. Then the sample was removed from the freezer and was allowed to thaw for 24 hours to room temperature. The sample was observed for flow properties, lump formation, and coagulation. The sample was considered to pass if it exhibited no coagulation. This cycle of freezing-thawing was repeated until either the paint coagulated or until a total of five cycles were completed with no coagulation.

Wet Adhesion

Scrub panels were prepared by drawing down a 3 mil film of a semi-gloss alkyd base (chosen as being the most difficult test for wet adhesion) onto a leneta chart. The charts were aged at least one week at room temperature. The test latex paints were then drawn down into a 3 mil film onto the aged alkyd surface and allowed to dry for 48 hours. The dried charts were affixed to glass panels and put into the scrub machine equipped with a scrub brush and a basin for holding the panel. The brush was conditioned by immersing it in warm water for 30 minutes and then placed in the machine holder. The test panel was placed in the basin under the brush and 200 g of warm (50° C.) water were added to the basin. The scrub machine was started and run for 400 strokes. If the coating remained intact, 8 gm of a dry abrasive (Ajax®) were placed under the brush and the machine run for another 100 strokes. The last step was repeated until the coating failed, that is, when the test paint stripped from the alkyd base. The number of strokes to failure was recorded.

| Solvent Free Semi-Gloss Paint Formula | |
|---|---|
| | Pounds per 100 U.S. Gallon |
| Water | 125.0 |
| BYK ® 155 dispersant | 4.5 |
| BYK ® 034 defoamer | 2.0 |
| Surfynol ® CT-111 | 2.5 |
| Potassium Hydroxide 45% | 2.5 |
| Kronos 2020 | 250.0 |
| ASP 170 | 45.0 |
| Polyphobe ® 102 | 4.0 |
| Disperse 5 to 6 Hegman | |
| Water | 130.0 |
| Polyphobe ® X9823 | 25.0 |
| Latex binder (50% Solids) | 500.0 |
| Igepal ® CO-630 | 1.5 |
| Kathon LX | 0.4 |
| BYK 034 | 2.0 |
| | 1093.9 |

PVC - 27.2%
Weight Solids - 51.27%
Volume Solids - 36.81%
Pounds per U.S. Gallon - 10.87
60° Gloss - 55

Source

1. BYK® 155 dispersant is a solution of sodium salt of an acrylic acid copolymer, available from BYK Chemie.
2. BYK® 034 defoamer is a proprietary mixture of hydrophobic components in paraffin based mineral oil, silicone containing, available from BYK Chemie.
3. Surfynol® CT-111 surfactant is an ethylene oxide adduct of acetyleneic glycols, available from Air Products.
4. Kronos 2020 is rutile titanium dioxide, available from Kronos, Inc.
5. ASP-170 is aluminum silicate pigment, available from Engelhard Corporation.
6. Polyphobe is a proprietary urethane associative thickener, available from Union Carbide.
7. Igepal CO-630 is a nonylphenol ethoxylate non-ionic surfactant, available from Rhone-Poulenc.
8. Kathon LX is a microbiocide having active ingredients of 5-chlor-2-methyl-4-isothazolin-3-one and 2-methyl-4-isothazolin-3-one present in an amount up to 14% available from Rohm & Haas.
9. Hegman is a unit of grind used in the industry.

EXAMPLE I

An acrylic latex binder was prepared according to the formula and procedure given below.

| Ingredients | Concentration in pphm |
| --- | --- |
| Water | 34.3 |
| Monomer Mix | |
| Water | 36.6 |
| Dodecylbenzene Sulfonate (23%) | 4.3 |
| Methacrylic Acid | 0.8 |
| Sipomer WAM2 | 1.0 |
| Methyl methacrylate (MMA) | 41.9 |
| Butyl acrylate (BA) | 56.3 |
| Catalyst Solution | |
| Water | 18.0 |
| Ammonium persulfate | 0.4 |

In a 3 liter vessel, equipped with a reflux condenser, addition funnels, and stirrer. An initial water charge was added to the reactor with agitation at 100 rpm. The reactor was heated to 78° C. A 22 grams portion of the monomer mix and 14 grams of the catalyst solution were then charged to the reaction vessel and the reaction mixture was held for 20 minutes at 78° C. The remainder of the monomer mix was metered into the reaction over a period of 4 hours. The catalyst solution was metered to the reactor over a period of 4.5 hours. The reaction was then held for 10 minutes at 78° C. and was cooled to room temperature. As the reaction mixture was cooling down, 0.3 gram of t-butyl hydroperoxide in 5 grams of water and 0.3 gram of sodium formaldehyde sulfoxylate were added when the temperature of reaction was at 65° C. The pH of the dispersion latex was adjusted to between 7 to 8 by the addition of 26.6% aqueous ammonium hydroxide solution.

The resulting comparative latex binder was designated 1A and had the following physical properties: 50.49% solids, particle size of 268 nm, pH of 7.5 and MFFT of ~0° C.

Comparative latex binders 1B and 1C were prepared using the same procedure as described in Example I, except that the amount of methacrylic acid was increased to 2 pphm and 3 pphm, respectively. The physical properties of latexes 1A–1C are given in Table 1. Latex binders 1A through 1C were formulated in the volatile solvent-free, semi-gloss paint formulation and were tested for freeze-thaw stability. Paint compositions containing latex binders 1A and 1C were tested for abrasion resistance. Results are set forth in Table 1.

TABLE 1

| Latex Binder | 1A | 1B | 1C |
| --- | --- | --- | --- |
| Methacrylic acid (MAA)[a] | 1.0 | 2.1 | 3.0 |
| Freeze-thaw Stability | failed | failed 3rd cycle | passed 5 cycles |
| % Solids | 50.49 | 50.3 | 50.42 |
| P.S. (nm) | 268 | 273 | 275 |
| Abrasion Resistance (Strokes to Failure) | 950 | | 160 |

[a]pphm

The data shows that the level of methacrylic acid required to obtain a freeze-thaw stable latex paint which contains no volatile freeze-thaw additive must be at least 3 pphm. However, as the data also shows, when the level of methacrylic acid is increased to form a freeze-thaw stable latex binder (1C), the abrasion resistance is dramatically reduced. It is apparent, then, that balanced properties of freeze-thaw stability and abrasion resistance must be considered in formulating the latex paint compositions.

EXAMPLE II

A series of acrylic latex binders, designated as 1 D, 1 E, 1F and 1 G, was prepared using the procedure and monomer composition as described in Example I, except that each latex binder contained methoxy polyethylene glycol methacrylate or polyethylene glycol methacrylate (PPEG monomer) with the molecular weight of ethylene oxide ranging from 220 to 1760. The latex binders also contain a Sipomer WAM2 wet adhesion monomer. The level of PPEG monomer (pphm) used in preparing the latex binder compositions and physical properties of the latex binders are given in Table 2.

TABLE 2

| Latex Binder | 1D | 1E | 1F | 1G |
| --- | --- | --- | --- | --- |
| Polyethylene glycol methacrylate (MW of EO = 220)[a] | 1.5 | | | |
| Polyethylene glycol methacrylate (MW of EO = 440)[a] | | 1.5 | | |
| Methoxy Polyethylene glycol methacrylate (MW of EO = 880)[a] | | | 1.5 | |
| Methoxy Polyethylene glycol methacrylate (MW of EO = 1760)[a] | | | | 1.5 |
| Physical Properties: | | | | |
| % Solids | 50.17 | 51.3 | 51.4 | 51.8 |
| P.S. (nm) | 284 | 279 | 323 | 261 |

[a]pphm

Latexes 1D, 1E, 1F and 1G were formulated in the semi-gloss solvent-free paint formula and were tested for abrasion resistance, wet adhesion, freeze-thaw stability, and block resistance. The results are set forth in Table 3.

TABLE 3

| | Properties of Paint Formulations | | | | |
|---|---|---|---|---|---|
| Latex Binder | 1D | 1E | 1F | 1G | 1C |
| EO molecular weight | 220 | 440 | 880 | 1760 | |
| Film formation @ <5° C. | smooth | smooth | smooth | smooth | smooth |
| Abrasion Resistance (strokes to failure) | 580 | 448 | 362 | 340 | 160 |
| Wet Adhesion (strokes to failure) | 1500 | 1500 | 1100 | 900 | 800 |
| Freeze-thaw Stability | passed 5 cycles | passed 5 cycles | passed 5 cycles | passed 5 cycles | passed 5 cycles |
| Block Resistance 25/40° C. | | | | | |
| 1 day | 4/3 | 4/3 | 5/3 | 3/0 | 0/0 |
| 4 days | 8/5 | 6/4 | 3/5 | 1/0 | 0/0 |
| 7 days | 8/6 | 7/4 | 5/3 | 3/1 | 0/0 |

The data in Table 3 show that as the molecular weight of ethylene oxide in the PPEG monomer increases above 880, properties such as abrasion resistance, wet adhesion, and block resistance tend to decrease. One skilled in the art will recognize that these properties may be improved to some extent by the addition of emulsifiers and/or dispersant systems to the paint formulation. Additionally, pigment volume concentration may be adjusted for the same purpose.

EXAMPLE III

Latex binder 1H was synthesized using the same procedure as described in Example 2, except that the monomer composition comprised styrene/methyl methacrylate/butyl acrylate; 10/32.5/57.5 weight %, respectively. Latex 1H had 51.20% solids, particle size of 224 nm, pH of 7.5 to 8.0 and MFFT ~0° C.

EXAMPLE IV

An acrylic latex binder was prepared by using a two-stage emulsion polymerization technique. The formula and procedure are given below.

| Ingredients | Grams | Concentration in PPHM |
|---|---|---|
| Initial Water | 256.3 | 33.6 |
| Monomer Mix #1 | | |
| Water | 169.81 | 27.3 |
| Rhodacal DS-4* | 20.17 | 2.65 |
| Methacrylic Acid | 3.16 | 0.41 |
| Sipomer WAM2 | 6.83 | 0.90 |
| MMA | 145.83 | 19.0 |
| BA | 309.80 | 40.6 |
| Catalyst Solution | | |
| Water | 134.76 | 17.7 |
| Ammonium persulfate | 3.0 | 0.40 |
| Monomer Mix #2 | | |
| Water | 104.05 | 143.7 |
| Rhodacal DS-4 | 12.37 | 1.62 |
| Methacrylic Acid | 1.94 | 0.25 |
| Sipomer WAM2 | 4.19 | 0.55 |
| MMA | 161.99 | 22.3 |
| BA | 117.29 | 15.4 |
| PEG (200 mw)methacrylate | 11.02 | 1.44 |

*anionic surfactant available from Rhone-Poulenc.

Procedure

Into a 3 liter vessel, equipped with a reflux condenser, addition funnels and stirrer, an initial water charge was added with agitation at 100 rpm. The reactor was heated to 78° C. A 22 grams charge of monomer Mix #1 and 14.0 g of the catalyst solution were then charged to the reaction vessel and the reaction mixture was held for 20 minutes for seed formation at 78° C. The remainder of monomer Mix #1 was added over 2½ hours. The catalyst solution was added over a period of 4.5 hours. The reactor content was then held at 78° C. for 10 minutes. Monomer Mix #2 was added to the reactor over 1½ hours. At the completion of catalyst solution addition, the reactor content was cooled to room temperature. As the reaction mixture was cooling down, a mixture of 0.3 gram of t-butyl hydroperoxide in 5 grams of water, and 0.3 gram of sodium formaldehyde sulfoxylate in 10 grams of water were added when the temperature was at 65° C. The pH of the emulsion was adjusted to between 7 to 8 by the addition of 26.6% aqueous ammonium hydroxide solution.

The resulting latex was designated as latex 1I and had the following physical properties: 51.1% solids, particle size of 259 nm, pH of 8.0 and MFFT of ~0° C.

Latexes 1H and 1I were formulated into the semi-gloss, solvent-free paint formula and were tested for abrasion resistance, wet adhesion, block resistance and freeze-thaw stability. Results are set forth in Table 4.

TABLE 4

| | Properties of Paint Formulations | | |
|---|---|---|---|
| Latex | 1H | 1I | 1D |
| Abrasion resistance (strokes to failure) | 840 | 354 | 580 |
| Wet adhesion (strokes to failure) | 2200 | 1550 | 1500 |
| Freeze-thaw Stability | passed 5 cycles | passed 5 cycles | passed 5 cycles |
| Block resistance 22° C./40° C. | | | |
| 1 day | 4/3 | 4/3 | 4/3 |
| 4 days | 8/6 | 8/4 | 8/5 |
| 7 days | 8/6 | 8/5 | 8/6 |

The results in Table 4 show that when the PPEG monomer is polymerized in the styrene/acrylic latex binder (1H), the latex paint properties such as abrasion resistance and wet adhesion are dramatically increased while maintaining the freeze/thaw stability and block resistance.

EXAMPLE V

A series of acrylic latex binders was prepared with the same procedure described in Example 2, but with different copolymerizable surfactants to study the effect of hydrophobicity of copolymerizable monomers on freeze-thaw stability. The monomer compositions and physical properties are shown in Table 4. The latex binders were formulated in the solvent free, semi-gloss paint formula and tested for freeze-thaw stability. Results are set forth in Table 5.

TABLE 5

|  | 1J | 1K | 1L | 1M |
|---|---|---|---|---|
| Allyl alcohol proproxylate[a] | 1.5 | | | |
| Behenyl polyethoxy ethyl methacrylate[a] (MW of EO = 1100) | | 1.5 | | |
| Ethoxylated nonyl phenol acrylate[a] (MW of EO = 176) | | | 1.5 | |
| Poly propylene glycol mono acrylate[a] (MW of PO = 348) | | | | 1.5 |
| Physical Properties: | | | | |
| Freeze-thaw Stability | Failed | Failed | Failed | Failed |
| % Solids | 49.1 | 51.0 | 50.8 | 50.5 |
| P. S. (nm) | 261 | 255 | 283 | 281 |

[a]pphm

The results in Table 5 show that if the copolymerizable surfactant monomer is too hydrophobic, the latex binders (1K, 1L, 1M and 1J) exhibit poor freeze-thaw stability.

EXAMPLE VI

An acrylic latex binder was prepared using the same procedure as described in Example I, but with 1 pphm of an anionic surfactant and 3 pphm of a non-polymerizable, non-ionic surfactant which contains an ethylene oxide moiety having molecular weight of 1760. The latex was designated 1N, which had the following physical properties: 50% solids, the particle size of 153 nm, pH of 8.0 and a MFFT of ~0° C.

Latex 1N was formulated into the semi-gloss, solvent-free formula and was tested for abrasion resistance, wet adhesion, block resistance, and freeze-thaw stability. The results are set forth in Table 6.

TABLE 6

| Latex | 1N | 1D |
|---|---|---|
| Anionic Surfactant | | X |
| Anionic Nonionic Surfactant Blend | X | |
| polyethylene glycol methacrylate (MW of EO = 220) | | X |
| Abrasion resistance (strokes to failure) | 800 | 580 |
| Wet Adhesion (strokes to failure) | 2100 | 1500 |
| Freeze-thaw Stability | Passed 5 cycles | Passed 5 cycles |
| Block Resistance (25° C./40° C.) | | |
| 1 day | 0/0 | 4/3 |
| 4 days | 0/0 | 8/5 |
| 7 days | 0/0 | 8/6 |

From this data, it is shown that when a blend of anionic and non-ionic surfactants is used to prepare a latex binder, the blocking resistance of the formulated latex paint is completely destroyed. However, where the nonionic PPEG monomer is polymerized with the acrylic monomers in the presence of an anionic surfactant, the blocking resistance is maintained.

We claim:

1. A latex paint composition, comprising: a latex which comprises
   (a) a polymer which is the polymerization product of
      (i) a polymerizable polyethylene glycol monomer of Structure I

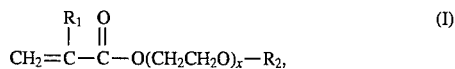

wherein $R_1$ and $R_2$ are independently H or $CH_3$ and x is from about 4 to 25, and wherein the polymerizable polyethylene glycol monomer is present in an amount effective to impart freeze-thaw stability to the latex without the use of a volatile freeze-thaw additive, up to about 2.5 pphm and wherein the molecular weight of the ethylene oxide moiety in said polymerizable polyethylene glycol monomer is from about 200 to about 1000,
      (ii) at least one acrylic monomer which is copolymerizable with the polymerizable polyethylene glycol monomer;
      (iii) 0 to 40 pphm of a styrenic monomer;
      (iv) an ionic monomer present in an amount effective to impart mechanical stability to the latex, up to 2 pphm; and
      (v) 0 to 2 pphm of a wet adhesion monomer,
   (b) water; and
   (c) an emulsifier selected from the group consisting of anionic, cationic and nonionic emulsifiers present in amounts effective to disperse the polymer in the water, wherein the polymer is present in amounts effective to function as a binder in the latex paint composition and wherein the latex and the latex paint composition are freeze-thaw stable and mechanically stable.

2. The latex paint of claim 1 wherein the acrylic monomer is selected from the group consisting of $C_1$-$C_{10}$ alkyl esters of $\alpha,\beta$-ethylenically unsaturated $C_2$-$C_6$ monocarboxylic acids, hydroxy $C_1$-$C_4$ alkyl esters of $\alpha,\beta$-ethylenically unsaturated $C_2$-$C_6$ monocarboxylic acids, and $C_4$-$C_8$ alkyl diesters of $\alpha,\beta$-ethylenically unsaturated $C_4$-$C_8$ dicarboxylic acids.

3. The latex paint of claim 1 wherein the latex paint is substantially free of volatile freeze-thaw additives.

4. The latex paint of claim 1 wherein the latex paint is substantially free of volatile coalescents.

5. The latex paint of claim 3 wherein the latex paint is substantially free of volatile coalescents.

6. A method for preparing freeze-thaw stable latex paint compositions, the method comprising formulating into the latex paint composition a latex comprising:
   (a) a polymer which is the polymerization product of
      (i) a polymerizable polyethylene glycol monomer of Structure I

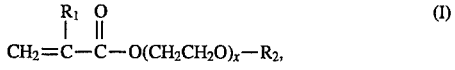

wherein $R_1$ and $R_2$ are independently H or $CH_3$ and x is from about 4 to 25, and wherein the polymerizable polyethylene glycol monomer is present in an amount effective to impart freeze-thaw stability to the latex without the use of a volatile freeze-thaw additive, up to about 2.5 pphm and wherein the molecular weight of the ethylene oxide moiety in said polymerizable polyethylene glycol monomer is from about 200 to about 1000,
      (ii) at least one acrylic monomer which is copolymerizable with the polymerizable polyethylene glycol monomer;

(iii) 0 to 40 pphm of a styrenic monomer;
(iv) an ionic monomer present in an amount effective to impart mechanical stability to the latex, up to 2 pphm; and
(v) 0 to 2 pphm of a wet adhesion monomer,
(b) water; and
(c) an emulsifier selected from the group consisting of anionic, cationic and nonionic emulsifiers present in amounts effective to disperse the polymer in the water, wherein the polymer is present in amounts effective to function as a binder in the latex paint composition and wherein the latex and the latex paint composition are freeze-thaw stable and mechanically stable.

7. The method of claim 6 wherein the acrylic monomer is selected from the group consisting of $C_1$-$C_{10}$ alkyl esters of $\alpha,\beta$-ethylenically unsaturated $C_2$-$C_6$ monocarboxylic acids, hydroxy $C_1$-$C_4$ alkyl esters of $\alpha,\beta$-ethylenically unsaturated $C_2$-$C_6$ monocarboxylic acids, and $C_4$-$C_8$ alkyl di-esters of $\alpha,\beta$-ethylenically unsaturated $C_4$-$C_8$ dicarboxylic acids.

8. The method of claim 6 wherein the latex paint is substantially free of volatile freeze-thaw additives.

9. The method of claim 6 wherein the latex paint is substantially free of volatile coalescents.

10. The latex paint of claim 8 wherein the latex paint is substantially free of volatile coalescents.

* * * * *